United States Patent
Kodera et al.

(10) Patent No.: US 11,560,115 B2
(45) Date of Patent: *Jan. 24, 2023

(54) AIRBAG BASE FABRIC AND AIRBAG

(71) Applicant: SEIREN CO., LTD., Fukui (JP)

(72) Inventors: Shota Kodera, Fukui (JP); Tsuyoshi Houraiya, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/043,387

(22) PCT Filed: Mar. 26, 2019

(86) PCT No.: PCT/JP2019/012633
§ 371 (c)(1),
(2) Date: Sep. 29, 2020

(87) PCT Pub. No.: WO2019/189043
PCT Pub. Date: Oct. 3, 2019

(65) Prior Publication Data
US 2021/0016739 A1 Jan. 21, 2021

(30) Foreign Application Priority Data
Mar. 30, 2018 (JP) ............... JP2018-066875

(51) Int. Cl.
*B60R 21/235* (2006.01)
*D01F 6/62* (2006.01)
(Continued)

(52) U.S. Cl.
CPC ............ *B60R 21/235* (2013.01); *B60R 21/16* (2013.01); *D01F 6/62* (2013.01); *D03D 1/02* (2013.01);
(Continued)

(58) Field of Classification Search
CPC .......... B60R 2021/23509; B60R 2021/23542; B60R 21/16; B60R 21/235; B60R 21/36; D01F 6/62; D03D 15/00; D10B 2505/124
See application file for complete search history.

(56) References Cited

U.S. PATENT DOCUMENTS 5,637,385 A 6/1997 Mizuki et al.
10,760,188 B2 * 9/2020 Kodera ................. B60R 21/237
(Continued)

FOREIGN PATENT DOCUMENTS

CN 102470558 A 5/2012
CN 106133222 A 11/2016
(Continued)

OTHER PUBLICATIONS https://patents.google.com/patent/JPH07258940A/en?oq=JP+H07258940 (Year: 1995).*

(Continued)

*Primary Examiner* — Arti Singh-Pandey
(74) *Attorney, Agent, or Firm* — Birch, Stewart, Kolasch & Birch, LLP

(57) ABSTRACT

The present invention relates to an airbag base fabric including a woven fabric made from a yarn containing polyethylene terephthalate as the main raw material, the yarn having a single fiber fineness of 1.0 to 3.9 dtex and a total fineness of 280 to 470 dtex, and, in a Raman spectrum obtained by irradiating the yarn with a He—Ne laser with a wavelength of 630 nm, $I_x/I_0$ being 1.20 or more, where $I_x$ is the spectral intensity at 3083 cm$^{-1}$, and $I_0$=277.4.

3 Claims, 13 Drawing Sheets

(51) Int. Cl.
B60R 21/16 (2006.01)
D03D 1/02 (2006.01)
D03D 15/283 (2021.01)

(52) U.S. Cl.
CPC ............... *D03D 15/283* (2021.01); *B60R 2021/23509* (2013.01); *B60R 2021/23542* (2013.01); *D10B 2321/021* (2013.01); *D10B 2505/124* (2013.01)

(56) References Cited

U.S. PATENT DOCUMENTS

| | | |
|---|---|---|
| 2012/0095126 A1 | 4/2012 | Nakamura |
| 2017/0067189 A1 | 3/2017 | Yokoi |
| 2018/0327940 A1 | 11/2018 | Hunt et al. |
| 2020/0047704 A1* | 2/2020 | Kodera ................ B60R 21/237 |
| 2020/0247348 A1* | 8/2020 | Kodera ................ D03D 1/02 |
| 2020/0307497 A1* | 10/2020 | Kodera ................ B60R 21/235 |
| 2021/0140073 A1* | 5/2021 | Kodera ................ B60R 21/235 |

FOREIGN PATENT DOCUMENTS

| | | |
|---|---|---|
| JP | 6-128836 A | 5/1994 |
| JP | 7-48717 A | 2/1995 |
| JP | 7-90746 A | 4/1995 |
| JP | 7-258940 A | 10/1995 |
| JP | 8-134716 A | 5/1996 |
| WO | WO 2017/079499 A1 | 5/2017 |

OTHER PUBLICATIONS

International Search Report (PCT/ISA/210) issued in PCT/JP2019/012633 dated Jun. 4, 2019.
Written Opinion (PCT/ISA/237) issued in PCT/JP2019/012633 dated Jun. 4, 2019.
Extended European Search Report for European Application No. 19774749.6, dated Nov. 8, 2021.
Chinese Office Action and Search Report for corresponding Chinese Application No. 201980023042.8, dated Jun. 6, 2022, with English translation.

* cited by examiner

Fig. 11 Example 2

AIRBAG BASE FABRIC AND AIRBAG

TECHNICAL FIELD

The present invention relates to a base fabric used in an airbag that is configured to be mounted to the exterior of a vehicle and deploy so as to protect a pedestrian or the like when struck by the vehicle in the event of an accident.

BACKGROUND ART

Airbag devices are widely provided in vehicles as safety devices for occupant protection that protect an occupant from impact when a vehicle undergoes a collision. In recent years, exterior airbags not only for occupant protection but for protection for a pedestrian or the like when struck by a vehicle have also been provided in some vehicles.

Airbags for occupant protection are provided in the interior of vehicles, for example, in steering wheels or seats, and are therefore basically isolated from environments outside the vehicles by vehicle bodies and windows. Meanwhile, exterior airbags are mounted in hoods or the like, and are therefore exposed to environments, such as ambient air, water, and sand and grit. In particular, oxidizing gases called photochemical oxidants, such as ozone, have a significant influence and may cause deterioration in airbags. For this reason, unlike base fabrics used in conventional airbags for occupant protection, base fabrics used in exterior airbags are required to be resistant to an oxidizing gas.

Moreover, since the inside of the hoods in which exterior airbags are to be mounted is occupied by engines and the like, there is no space, and if an attempt is made to leave a space, the aerodynamic drag and the vehicles' appearance will be affected. For this reason, exterior airbags are also required to be capable of being compact when stored.

For example, Patent Literature 1 discloses a polyester fiber suitable for a base fabric used in a non-coated airbag that can be compact when stored, and specifies the intrinsic viscosity, the single fiber fineness, and the initial modulus of this polyester fiber. However, there is no description as to the environmental durability, and it cannot be said that this polyester fiber is suitable for exterior airbags.

CITATION LIST

Patent Literature

Patent Literature 1: JP H7-48717A

SUMMARY OF INVENTION

Technical Problem

The present invention relates to an airbag base fabric having excellent resistance to an oxidizing gas and excellent storability, as well as an airbag in which the airbag base fabric is used.

Solution to Problem

An airbag base fabric according to the present invention includes a woven fabric made from a yarn containing polyethylene terephthalate as a main raw material, the yarn having a single fiber fineness of 1.0 to 3.9 dtex and a total fineness of 280 to 470 dtex, and, in a Raman spectrum obtained by irradiating the yarn with a He—Ne laser with a wavelength of 630 nm, $I_x/I_0$ being 1.20 or more, where $I_x$ is a spectral intensity at 3083 $cm^{-1}$, and $I_0=277.4$.

In the above-described airbag base fabric, the polyethylene terephthalate may have an intrinsic viscosity of 0.80 to 1.20.

In the above-described airbag base fabric, the airbag base fabric may have a cover factor of 2400 to 2800.

An airbag according to the present invention is formed of at least one of the above-described airbag base fabrics.

Advantageous Effects of the Invention

According to the present invention, it is possible to provide an airbag base fabric having excellent resistance to an oxidizing gas and excellent storability, as well as an airbag in which the airbag base fabric is used.

DESCRIPTION OF EMBODIMENTS

An airbag base fabric according to the present invention includes a woven fabric made from a yarn containing polyethylene terephthalate as the main raw material, the yarn having a single fiber fineness of 1.0 to 3.9 dtex and a total fineness of 280 to 470 dtex, and, in a Raman spectrum obtained by irradiating the yarn with a He—Ne laser with a wavelength of 630 nm, $I_x/I_0$ being 1.20 or more, where $I_x$ is the spectral intensity at 3083 $cm^{-1}$, and $I_0=277.4$.

It is important that this base fabric is made from a yarn containing polyethylene terephthalate as the main raw material. When polyethylene terephthalate is used as the main raw material, deterioration due to oxidizing gases typified by ozone and the like is reduced, and a base fabric having excellent environmental durability can be obtained.

Figure 1:
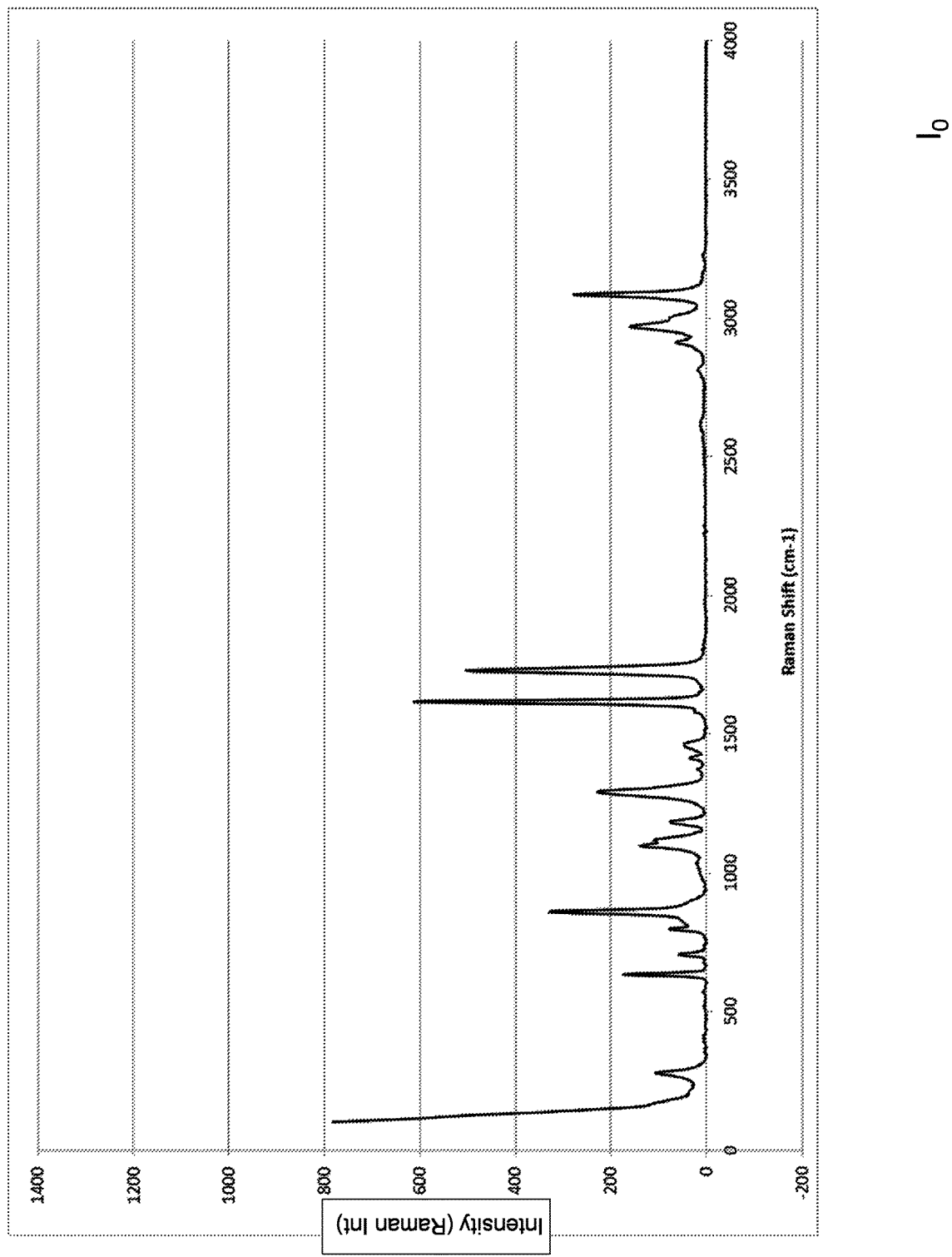
FIG. 1 shows the results of Raman spectrum measurement for a yarn serving as a reference.

Moreover, in the present invention, the crystal index of the yarn is specified. The crystal index is defined as follows. A Raman spectrum is obtained by irradiating a yarn serving as a reference with a He—Ne laser with a wavelength of 630 nm, and the spectral intensity at 3083 cm$^{-1}$ is read from the obtained Raman spectrum and defined as $I_0$. FIG. 1 shows the results of Raman spectrum measurement at this time, and from these results, $I_0$ is 277.4. A polyethylene terephthalate yarn (product name: 84T/36-SOD, fixed viscosity=0.64) manufactured by KB SEIREN, Ltd. was used as the yarn serving as the reference. On the other hand, with respect to a yarn to be used in the woven fabric as well, the spectral intensity is measured in a similar manner and defined as $I_x$. Note that the measurements of the Raman spectra can be performed using a microscope laser Raman spectrometer (LabRAM HR-600 manufactured by HORIBA, Ltd.).

Then, the ratio $I_x/I_0$ between the spectral intensities is calculated, and the calculated value is used as the crystal index. The crystal conditions (arrangement and orientation) in the yarn can be estimated by calculating the ratio between the spectral intensities obtained by Raman spectroscopy as described above. In particular, the spectral peak at 3083 cm$^{-1}$ has a relatively high intensity, and is considered to be likely to be affected by adjacent molecules because it is associated with a bond between a benzene ring and a carbon atom. For this reason, this spectral peak is employed. The thus calculated crystal index is preferably 1.20 or more, and more preferably 1.35 or more. When the crystal index is 1.20 or more, polymer molecules constituting the yarn are closely arranged and inhibit a chemical substance that accelerates deterioration from entering gaps between the polymer molecules, and thus, deterioration due to external factors can be suppressed. Moreover, the crystal index is preferably 1.60 or less. When the crystal index is 1.60 or less, the occurrence of fuzzing can be suppressed during weaving.

In order to perform control so that the crystal index of the yarn is within the above-described range, spinning conditions (temperature and speed) and drawing conditions (draw ratio and temperature) are set as appropriate. Polyethylene terephthalate is obtained through melt spinning. Therefore, molecules tend not to be closely arranged if the melting temperature is low or if rapid cooling is performed, whereas a high temperature may cause thermal degradation. Moreover, a low draw ratio leaves many portions where molecules are loosely arranged, and a high draw ratio tends to increase the occurrence of fuzzing. Furthermore, a low drawing temperature reduces the effect of orienting the molecules through drawing, and a high drawing temperature may cause thermal degradation as in the case of melting. Accordingly, the crystal index of the polyethylene terephthalate yarn according to the present invention can be set within the above-described range by adjusting the above-described conditions.

Moreover, polyethylene terephthalate used as the main raw material of the yarn has an intrinsic viscosity of preferably 0.80 to 1.20. When the intrinsic viscosity is 0.80 or more, the raw yarn can have a level of strength that is required for an airbag. When the intrinsic viscosity is 1.20 or less, the occurrence of fuzzing during weaving can be suppressed, and a densely woven fabric can be obtained.

The yarn constituting the above-described base fabric main body has a total fineness of preferably 280 dtex or more. When the total fineness of the yarn is 280 dtex or more, the tenacity of the base fabric is excellent for an airbag. Moreover, the total fineness is preferably 470 dtex or less, because a base fabric having excellent storability can be easily obtained.

The yarn constituting the base fabric main body may have the same single fiber fineness or different single fiber finenesses. However, it is important that the single fiber fineness is in a range from 1.0 dtex to 3.9 dtex, and more preferably, the single fiber fineness is in a range from 1.0 dtex to 3.5 dtex. Note that, when the total fineness of the yarn remains the same, a lower single fiber fineness provides superior storability.

The cross-sectional shape of single fibers can be selected from a circle, an ellipse, a flattened shape, a polygon, a hollow shape, other variants, and the like. Mixed fibers, doubling yarns, combined use yarns, mixed use yarns (the warp and the weft have different cross-sectional shapes), or the like thereof can be used as needed, and the cross-sectional shape can be selected as appropriate to the extent that the spinning process and the woven fabric manufacturing process are not hindered, or the properties of the woven fabric and the like are not impaired.

One or two or more of various additives that are usually used to improve spinnability, processability, durability, and the like of fibers may be used for these fibers. Examples of the additives include a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

In terms of the performance of the base fabric such as weavability and air permeability, it is preferable that the base fabric has a weave density of 48 to 68 yarns/2.54 cm with respect to both the warp and the weft.

The cover factor of the woven fabric is not particularly limited, but, for example, the cover factor is preferably 2400 or more, more preferably 2430 or more, and particularly preferably 2460 or more. When the cover factor is 2400 or more, gaps between weaving yarns are reduced, and excellent low air permeability can be obtained. Moreover, the cover factor is, for example, preferably 2800 or less, and more preferably 2600 or less. When the cover factor is 2800 or less, the flexibility of the woven fabric is unlikely to be reduced, and favorable foldability can be obtained. Note that, in the present invention, the cover factor (also referred to as "CF") means the value calculated using a formula below.

$$\text{Cover factor (CF)} = \text{Warp density of woven fabric} \times \sqrt{\text{(Total fineness of warp)}} + \text{Weft density of woven fabric} \times \sqrt{\text{(Total fineness of weft)}}$$

The base fabric of the present invention may be coated with a synthetic resin. The weight (application amount) of the synthetic resin per unit area of the base fabric main body that is coated with the synthetic resin is preferably in a range of 10 to 50 g/m$^2$. When it is 10 g/m$^2$ or more, low air permeability and thermal resistance that are required of a coated fabric used in an airbag can be obtained. When it is 50 g/m$^2$ or less, both good performance and a reduction in weight can be achieved. Note that one or both of the faces of the base fabric main body may be coated with the synthetic resin layer.

An airbag of the present invention can be obtained by joining at least one base fabric piece obtained by cutting the above-described base fabric into a desired shape. It is preferable that all of the base fabric pieces included in the airbag are formed of the above-described base fabric. The specifications, shape, and volume of the airbag can be selected in accordance with the site at which the airbag is to be arranged, the application, the storage space, the ability to absorb occupant impact, the output of an inflator, and the like. Furthermore, a reinforcing fabric may be added in accordance with performance requirements. The reinforcing fabric can be selected from a coated base fabric that is equivalent to the base fabric piece, a coated base fabric that is different from the base fabric piece, and a non-coated base fabric that is different from the base fabric piece.

The joining of the above-described base fabric pieces, the joining of the base fabric piece and a reinforcing fabric or a hanging string, and the fixing of other cut base fabrics to each other are performed mainly through sewing, but it is possible to use partial adhesion, welding, or the like in combination, or use a joining method using weaving or knitting as long as the airbag has sufficient robustness, impact resistance at the time of deployment, ability to absorb occupant impact, and the like to function as an airbag.

Cut base fabrics can be sewn together using a sewing method that is applied to a normal airbag, such as lock stitching, multi-thread chain stitching, one side down stitching, looping, safety stitching, zigzag stitching, flattened stitching, or the like. Also, the fineness of the sewing thread can be set to 700 dtex (corresponding to #20) to 2800 dtex (corresponding to #0), and the stitch count can be set to 2 to 10 stitches/cm. If stitch lines in a plurality of rows are required, a multi-needle sewing machine with the distance between stitch needles being about 2 mm to 8 mm can be used, but if the length of a portion to be sewn is not long, sewing may be performed a plurality of times using a single-needle sewing machine. If an airbag main body is formed using a plurality of base fabrics, the plurality of base fabrics may be sewn together in a stacked state, or may be sewn one to another.

The sewing thread used for sewing can be selected as appropriate from threads that are generally called synthetic sewing threads and threads that are used as industrial sewing threads. Examples thereof include polyamide yarns typified by nylon 6 yarns, nylon 66 yarns, and nylon 46 yarns, polyester yarns typified by polyethylene terephthalate yarns and polybutylene terephthalate yarns, macromolecular polyolefin yarns, fluorine-containing yarns, vinylon yarns, aramid yarns, carbon yarns, glass yarns, and steel yarns, and any of a spun yarn, a filament twisted yarn, and a processed filament resin yarn may be used. When consideration is given to environmental durability, cost, and workability during sewing, it is preferable to use polyester yarns, and particularly preferable to use polyethylene terephthalate yarns.

Furthermore, in order to prevent gas leaking from stitches in an outer circumferential seam portion or the like, a sealing material, an adhesive or a pressure-sensitive adhesive material, or the like may be applied to, sprayed onto, or stacked on upper portions and/or lower portions of stitches, gaps between stitches, a seam margin, or the like.

EXAMPLES

Hereinafter, the present invention will be described in greater detail based on examples, but the present invention is not limited to these examples.

Total Fineness of Yarn

Measurement was performed in accordance with method B in JIS L 1013 8.3.1.

Filament Count of Yarn

Measurement was performed in accordance with JIS L 1013 8.4.

Intrinsic Viscosity (IV) of Raw Material Polymer Chip of Yarn

An automatic viscometer (SS-600L1 manufactured by Shibayama Scientific Co., Ltd.) was used, and IV values of polymer solutions adjusted to a concentration of 10 g/L were measured. A mixed solution of phenol and tetrachloroethane (mixing ratio=6:4) was used as the solvent. The polymers were dissolved for 1 hour at 80° C. The measurements were performed under the conditions of 20° C. With respect to Comparative Example 2, which will be described later, the intrinsic viscosity was not measured because the material was different from those of the examples.

Single Fiber Fineness

The fineness was obtained by dividing the total fineness of the yarn by the filament count of the yarn.

Weave Density of Fabric

Measurement was performed in accordance with method A in JIS L 1096 8.6.1.

Crystal Index

The spectral intensity at 3083 $cm^{-1}$ was read from a Raman spectrum obtained by irradiating a polyethylene terephthalate yarn (product name: 84T/36-SOD, IV=0.64) manufactured by KB SEIREN, Ltd. with a He—Ne laser with a wavelength of 630 nm, and used as $I_0$. Furthermore, various yarns that were prepared were irradiated with a He—Ne laser with a wavelength of 630 nm in similar manners to obtain Raman spectra, and the spectral intensities at 3083 $cm^{-1}$ were read from the obtained Raman spectra and used as $I_x$. From these intensities, the intensity ratios $I_x/I_0$ were calculated and used as crystal indices. The polyethylene terephthalate yarn 84T/36-SOD manufactured by KB SEIREN, Ltd. was employed as a blank sample for these measurements because it was a yarn made only of polyethylene terephthalate and mainly used for clothes and was widely distributed in the market. The measurements of the Raman spectra were performed using a microscope laser Raman spectrometer (LabRAM HR-600 manufactured by HORIBA Ltd.). Since the crystal indices were calculated using the polyethylene terephthalate yarn as the reference, the crystal index was not calculated for Comparative Example 2 in which the material of the base fabric was different as will be described later.

Test for Resistance to Oxidizing Gas/Check for Deterioration Due to Ozone

Measurement samples with a size of 25 cm×5 cm were cut from each of prepared woven fabrics such that the cut measurement samples have respective longitudinal directions in the machine direction (length direction of the woven fabric) and the cross direction (width direction of the woven fabric). The measurement samples were subjected to a deterioration treatment under the conditions of an ozone concentration of 40 ppm and a temperature of 40° C. for 200 hours using an ozone aging tester (manufactured by Toyo Seiki Seisaku-sho, Ltd.), and then, the tear strength was measured in accordance with method C in JIS L 1096 8.17.3 and used as $O_1$. Also, the tear strength of similarly cut samples in an untreated state was measured and used as $O_0$. From the obtained results, $O_1/O_0\times100(\%)$ was calculated and used as the strength retention rate. It was evaluated that the strength retention rate needs to be 80% or more, preferably 90% or more.

Method for Producing Airbag for Storability Evaluation

Figure 2:
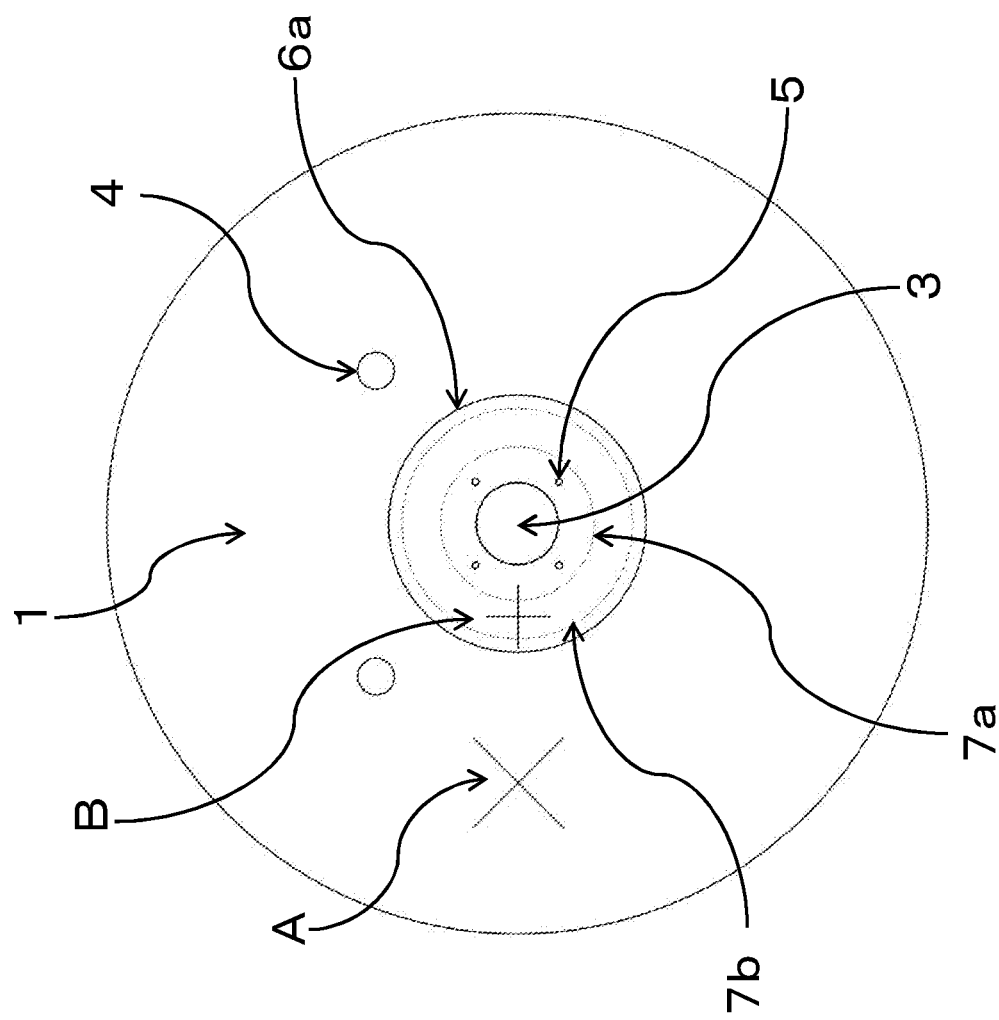
FIG. 2 is a front view showing a state in which three annular fabrics are sewn to an attachment opening-side main body base fabric of an airbag for evaluation.
Figure 3:
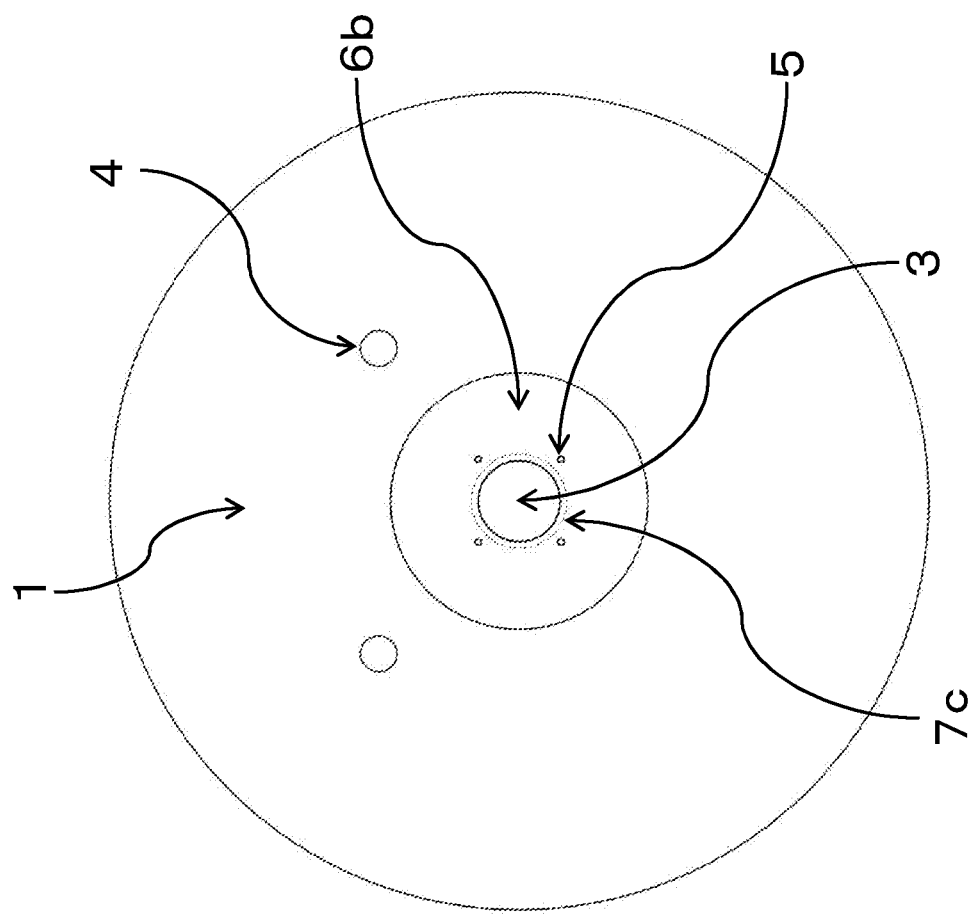
FIG. 3 is a front view showing a state in which four annular fabrics are sewn to the attachment opening-side main body base fabric of the airbag for evaluation.

The method for producing an airbag for evaluation is described below using FIGS. 2 to 5. As shown in FIGS. 2 and 3, a first main body base fabric 1 and a second main body base fabric 2 that had a circular shape with a diameter of 702 mm were cut from a prepared woven fabric. As shown in FIG. 2, in the first main body base fabric 1, an inflator attachment opening 3 with a diameter of 67 mm was formed in a central portion, and two (a pair of left and right) vents 4 with a diameter of 30 mm were formed centered on respective positions that were 125 mm in the upward direction and 115 mm in the left or right direction from the center of the attachment opening 3. Furthermore, in the first main body base fabric 1, bolt fixing holes 5 with a diameter of 5.5 mm were formed centered on respective positions that were 34 mm in the upward or downward direction and 34 mm in the left or right direction from the center of the attachment opening 3. In the second main body base fabric 2, none of the attachment opening, the vents, and the bolt fixing holes were formed.

Moreover, as reinforcing fabrics, a non-coated base fabric that was produced using a nylon 66 fiber of 470 dtex and 72 f and had a weave density of 53 yarns/2.54 cm, and a coated base fabric obtained by applying a silicone resin in an amount of 45 g/m$^2$ to a base fabric that was produced using a nylon 66 fiber of 470 dtex and 72 f and had a weave density of 46 yarns/2.54 cm were prepared. As reinforcing fabrics for the inflator attachment opening 3, three annular fabrics 6a with an outer diameter of 210 mm and an inner diameter of 67 mm were cut from the non-coated base fabric, and a single annular fabric 6b of the same shape was cut from the coated base fabric.

In all of the annular fabrics 6a and 6b, bolt fixing holes with a diameter of 5.5 mm were formed at positions corresponding to the bolt fixing holes 5 of the first main body base fabric 1. Then, the three annular fabrics 6a were stacked on the main body base fabric 1, in which the inflator attachment opening 3 was formed, such that weaving yarn directions of the reinforcing fabrics were rotated 45 degrees relative to the weaving yarn directions of the main body base fabric 1 (see weaving yarn directions A and B in FIG. 2), and the positions of the bolt fixing holes coincide. Here, A shown in FIG. 2 indicates the weaving yarn directions of the first main body base fabric 1, and B indicates the weaving yarn directions of the annular fabrics. Then, the fabrics were sewn together along circles centered on the attachment opening 3 at positions where the circles had a diameter of 126 mm (sewing portion 7a) and a diameter of 188 mm (sewing portion 7b). Furthermore, as shown in FIG. 3, the annular fabric 6b having the same shape was stacked thereon such that the weaving yarn directions of the annular fabric 6b match those of the annular fabrics 6a, and the four annular fabrics 6a and 6b were sewn to the main body base fabric 1 along a circle at a position where the circle had a diameter of 75 mm (sewing portion 7c). Note that the annular fabrics were sewn to the main body base fabric 1 using nylon 66 machine threads, with the needle thread having 1400 dtex and the bobbin thread having 940 dtex, and the sewing was performed through lock stitching with a stitch count of 3.5 stitches/cm.

Figure 4:
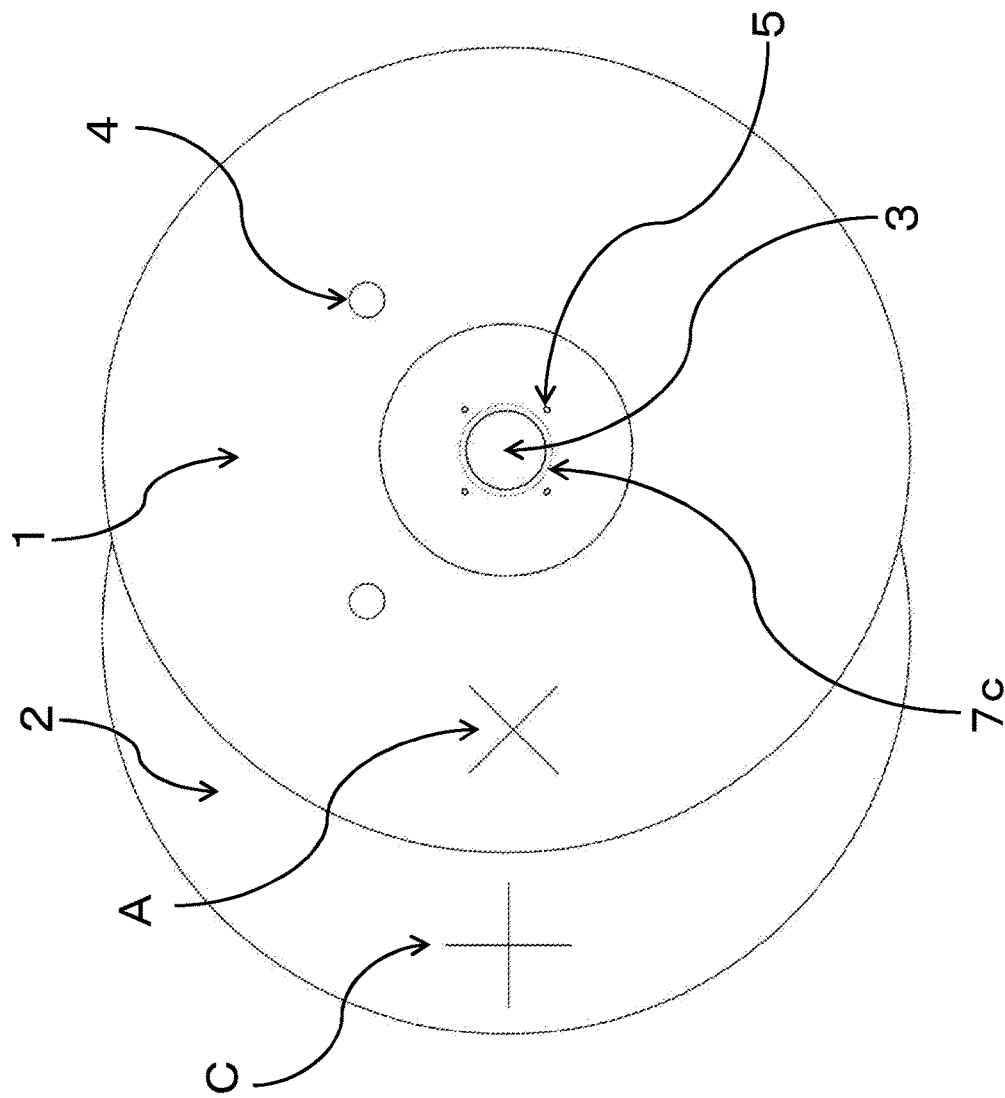
FIG. 4 is a front view showing a manner in which the attachment opening-side main body base fabric and an occupant-side main body base fabric of the airbag for evaluation are stacked together.
Figure 5:
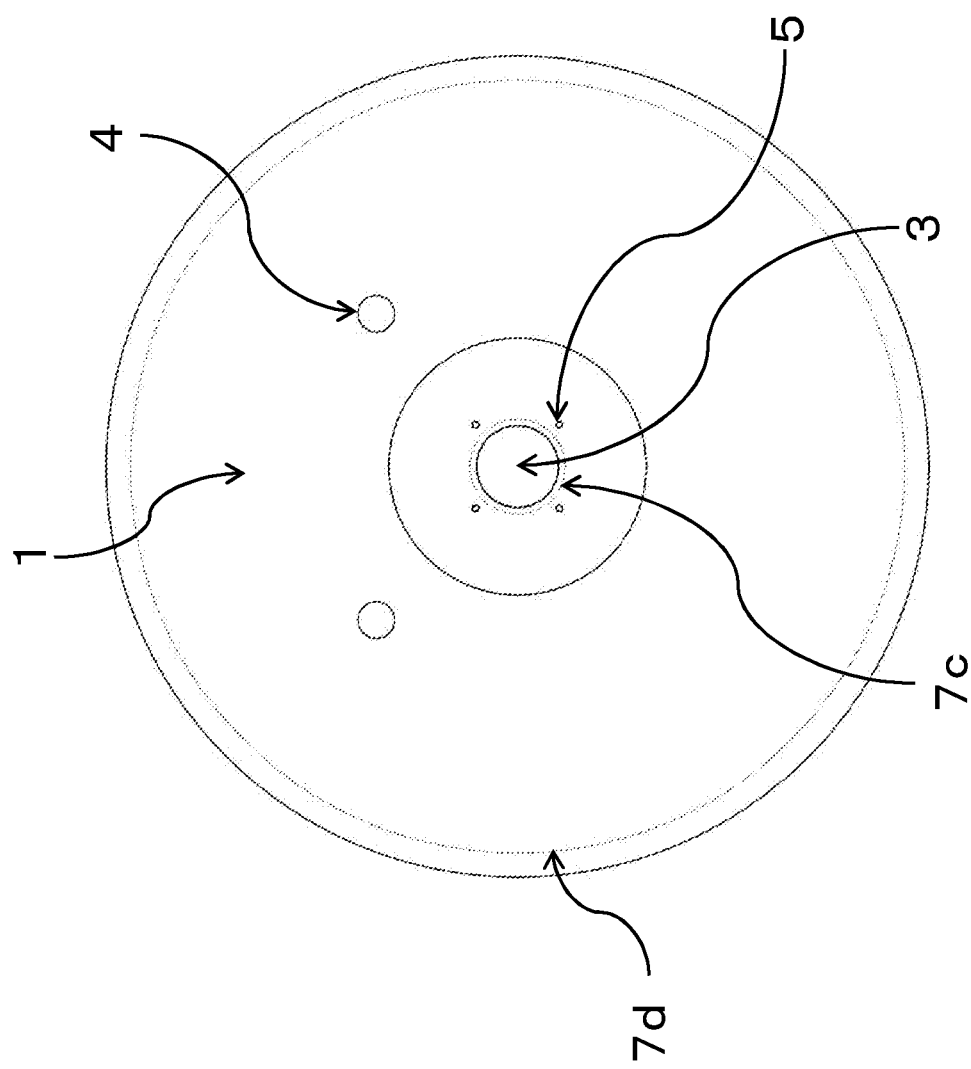
FIG. 5 is a front view showing a state in which the attachment opening-side main body base fabric and the occupant-side main body base fabric of the airbag for evaluation are sewn together.

Next, as shown in FIG. 4, the main body base fabrics 1 and 2 were stacked together such that the surface to which the annular fabrics were sewn faced outward, and the weaving yarn directions of the main body base fabric 1 were rotated 45 degrees relative to the weaving yarn directions of the main body base fabric 2. Here, A shown in FIG. 4 indicates the weaving yarn directions of the first main body base fabric 1, and C indicates the weaving yarn directions of the second main body base fabric 2. Then, as shown in FIG. 5, outer circumferential portions of the main body base fabrics were sewn together (sewing portion 7d) through multi-thread chain stitching in two stitch lines, with the distance between the stitch lines being 2.4 mm, while leaving a seam allowance of 13 mm. After the sewing was completed, the bag was turned inside out by pulling it through the attachment opening 3, and thus, a circular airbag with an inner diameter of 676 mm was obtained. The same sewing threads as those used in the lock stitching were used as the sewing threads for sewing the outer circumferential portions.

Evaluation of Storability of Airbag

Figure 6:
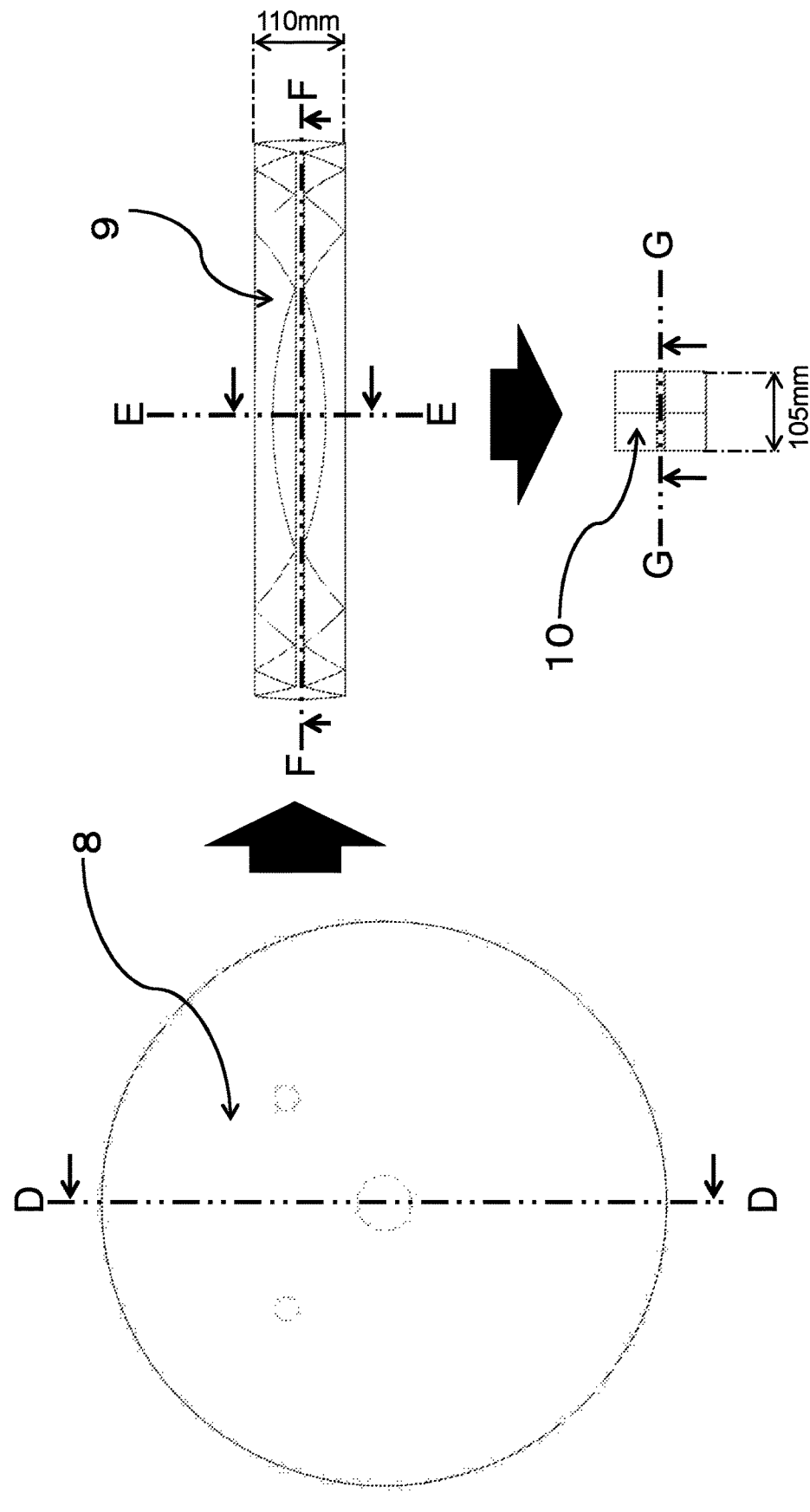
FIG. 6 shows front views of the airbag for evaluation and illustrates a folding procedure for a foldability evaluation test.
Figure 7:
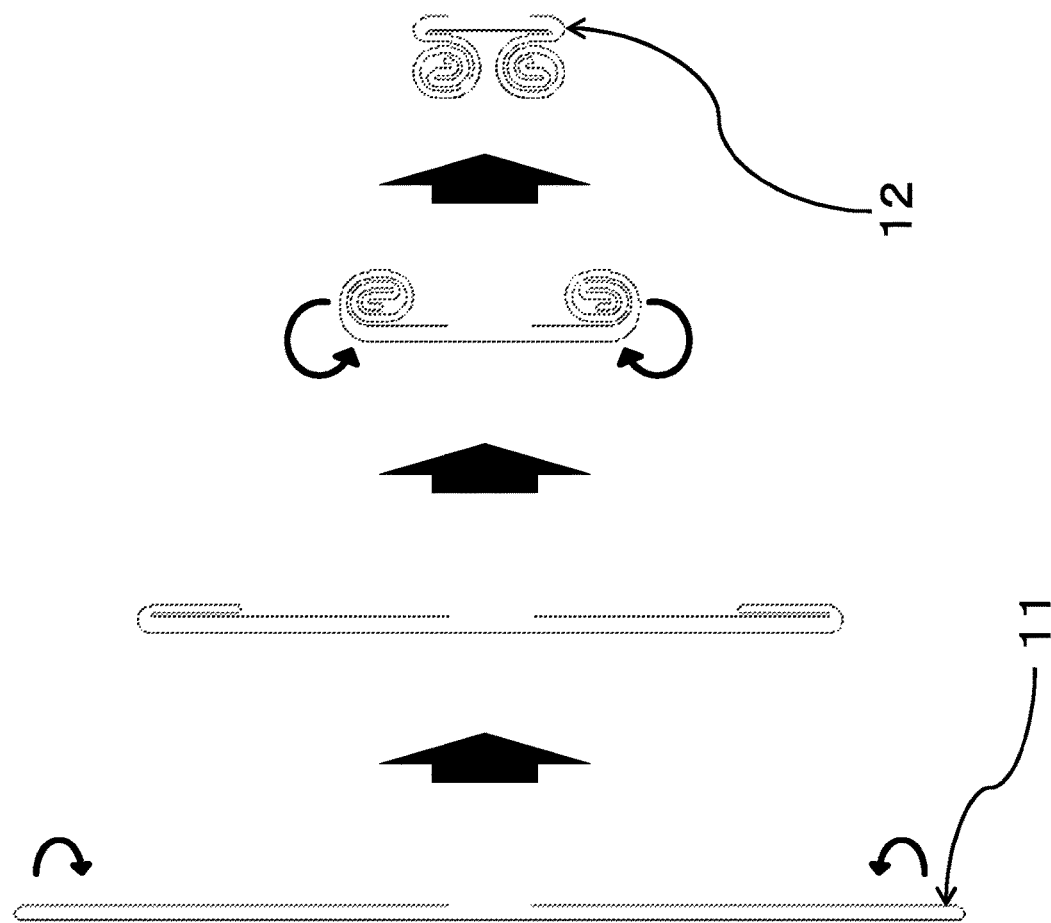
FIG. 7 shows cross-sectional views illustrating a folding method for the foldability evaluation test.
Figure 8:
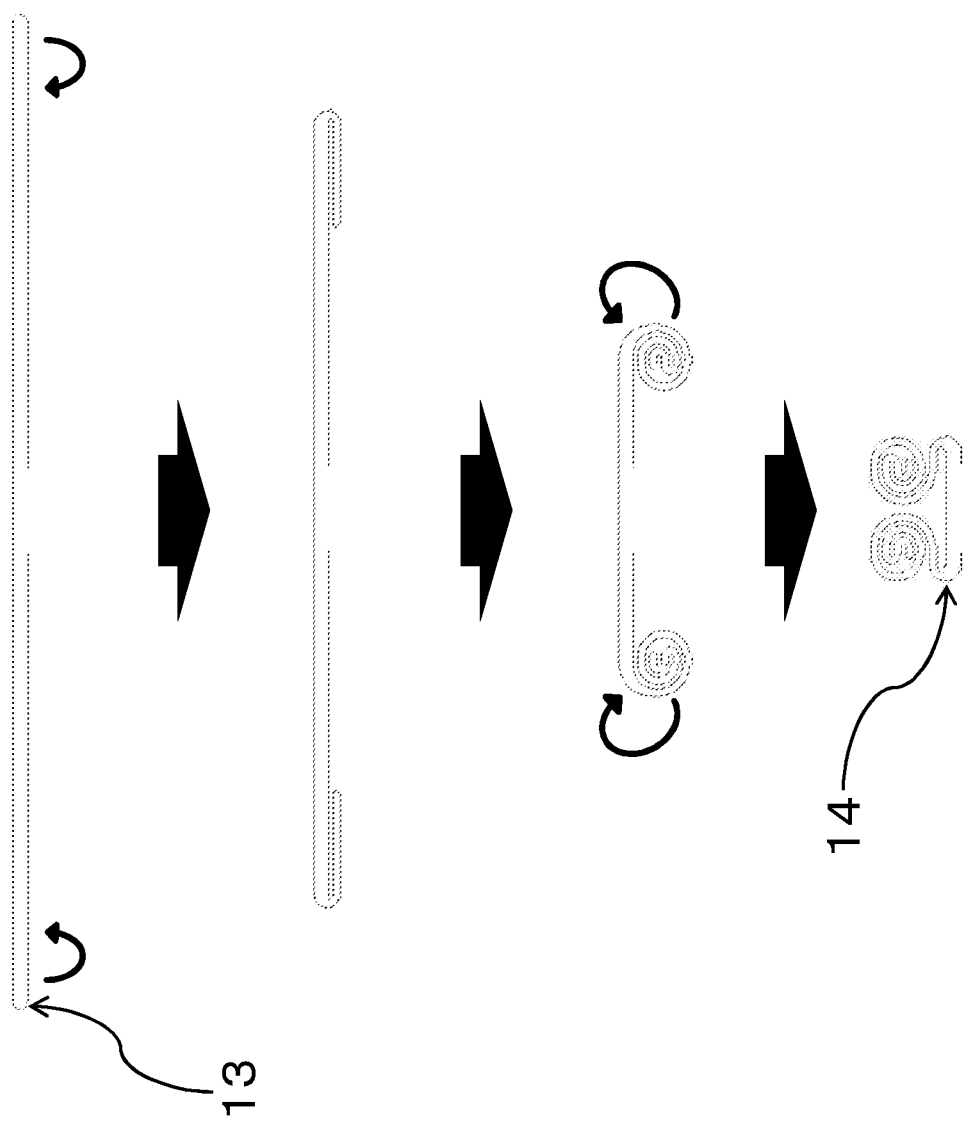
FIG. 8 shows cross-sectional views illustrating the folding method for the foldability evaluation test.

The airbag that was produced in the above-described manner was folded following a procedure illustrated in FIGS. 6 to 8. FIG. 6 is a diagram for illustrating the procedure for folding the airbag for evaluation and shows the second main body base fabric on the front side. FIG. 7 shows cross-sectional views taken along line D-D in FIG. 6 and illustrates the procedure when folding the airbag for evaluation from a form 8 prior to folding to an intermediate form 9. A cross-sectional view of the intermediate form 9 taken along line E-E in FIG. 6 corresponds to a state indicated by reference numeral 12 in FIG. 7. FIG. 8 shows cross-sectional views taken along line F-F in FIG. 6 and illustrates the procedure when folding the airbag for evaluation from the intermediate form 9 to a form 10 after the completion of folding. A cross-sectional view of the form 10 after the completion of folding taken along line G-G in FIG. 6 corresponds to a final form 14 shown in FIG. 8.

Figure 9:
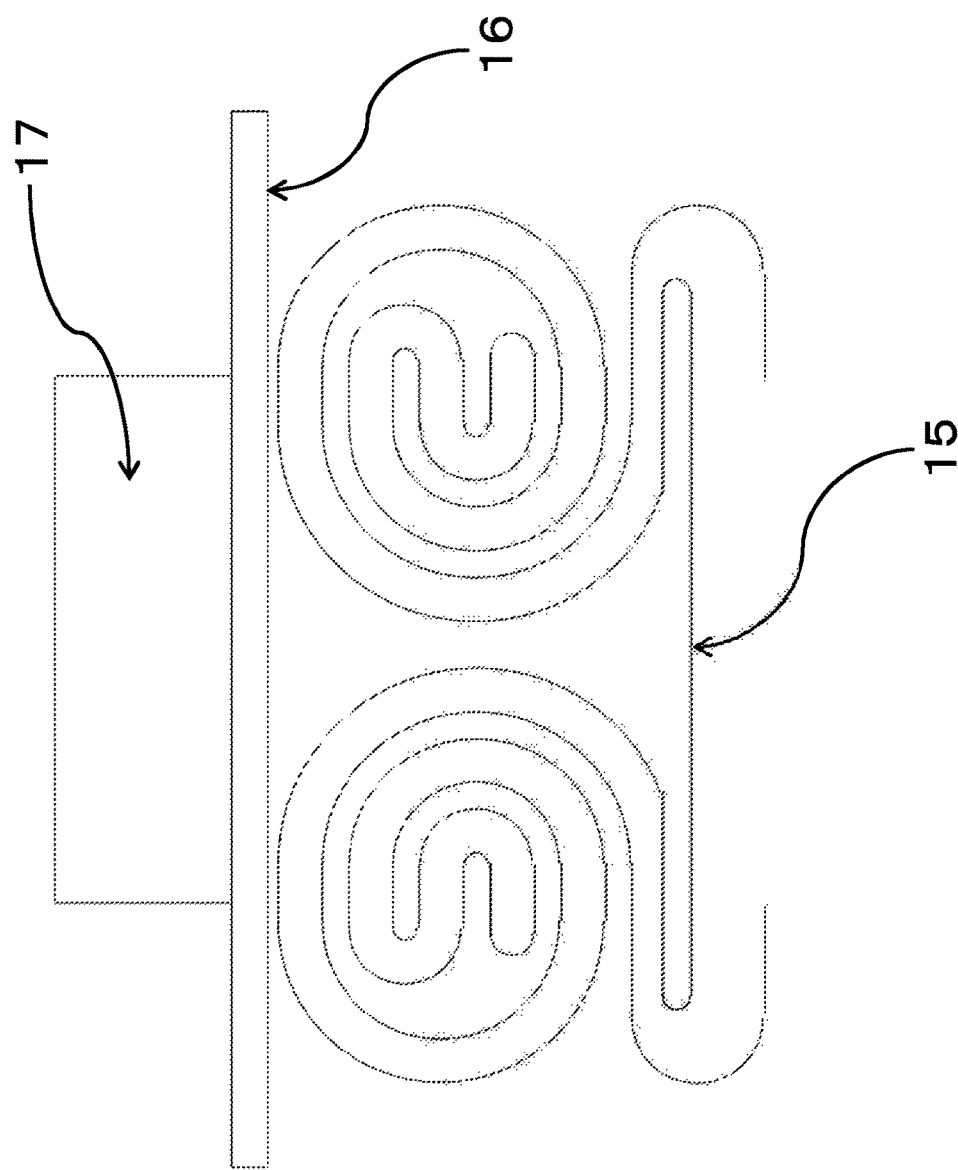
FIG. 9 is a cross-sectional view illustrating the folding method for the foldability evaluation test.

During the folding, an adjustment was made such that the intermediate form 9 had a through width of 110 mm, and an adjustment was made such that the form 10 after the completion of folding had a through width of 105 mm. After that, as shown in FIG. 9, an aluminum plate 16 with a size of 130 mm×130 mm×2 mm was placed on the folded airbag 15, and furthermore a weight 17 of 1 kg was placed on the aluminum plate 16. In this state, the height of the folded airbag 15 was measured. The evaluation was made based on the height after the folding, and a height of 45 mm or more was evaluated as B, and a height of less than 45 mm was evaluated as A. Note that 45 mm was determined with consideration given to storage spaces for airbags.

Table 1 below shows the results of the evaluation.

TABLE 1

|  |  |  | Ex. 1 | Ex. 2 | Ex. 3 | Ex. 4 | Com. Ex. 1 | Com. Ex. 2 | Com. Ex. 3 |
|---|---|---|---|---|---|---|---|---|---|
| Total fineness | dtex | | 470 | 330 | 470 | 470 | 560 | 470 | 470 |
| Filament count | filaments | | 182 | 144 | 144 | 182 | 182 | 144 | 144 |
| Single fiber fineness | dtex | | 2.58 | 2.29 | 3.26 | 2.58 | 3.08 | 3.26 | 3.26 |
| IV | — | | 0.90 | 0.90 | 0.90 | 0.90 | 0.87 | 0.78 | — |
| $I_X$ | | | 407.8 | 399.9 | 364.4 | 407.8 | 302.6 | 282.9 | — |
| Crystal index | — | | 1.47 | 1.44 | 1.31 | 1.47 | 1.09 | 1.02 | — |
| Density | yarns/2.54 cm | Warp | 57 | 71 | 57 | 53 | 53 | 57 | 53 |
| | | Weft | 57 | 71 | 57 | 53 | 53 | 57 | 53 |
| CF | — | | 2471 | 2580 | 2471 | 2298 | 2508 | 2471 | 2298 |
| Thickness | mm | | 0.29 | 0.26 | 0.29 | 0.28 | 0.32 | 0.29 | 0.31 |
| Deterioration due to ozone | % | Warp | 92 | 91 | 90 | 93 | 88 | 82 | 67 |
| (Strength retention rate) | | Weft | 94 | 85 | 81 | 91 | 80 | 75 | 64 |
| Storability | mm | | 42.9 | 40.8 | 43.8 | 41.9 | 51.5 | 43.5 | 49.3 |
| | — | | A | A | A | A | B | A | B |

Example 1

Figure 10:
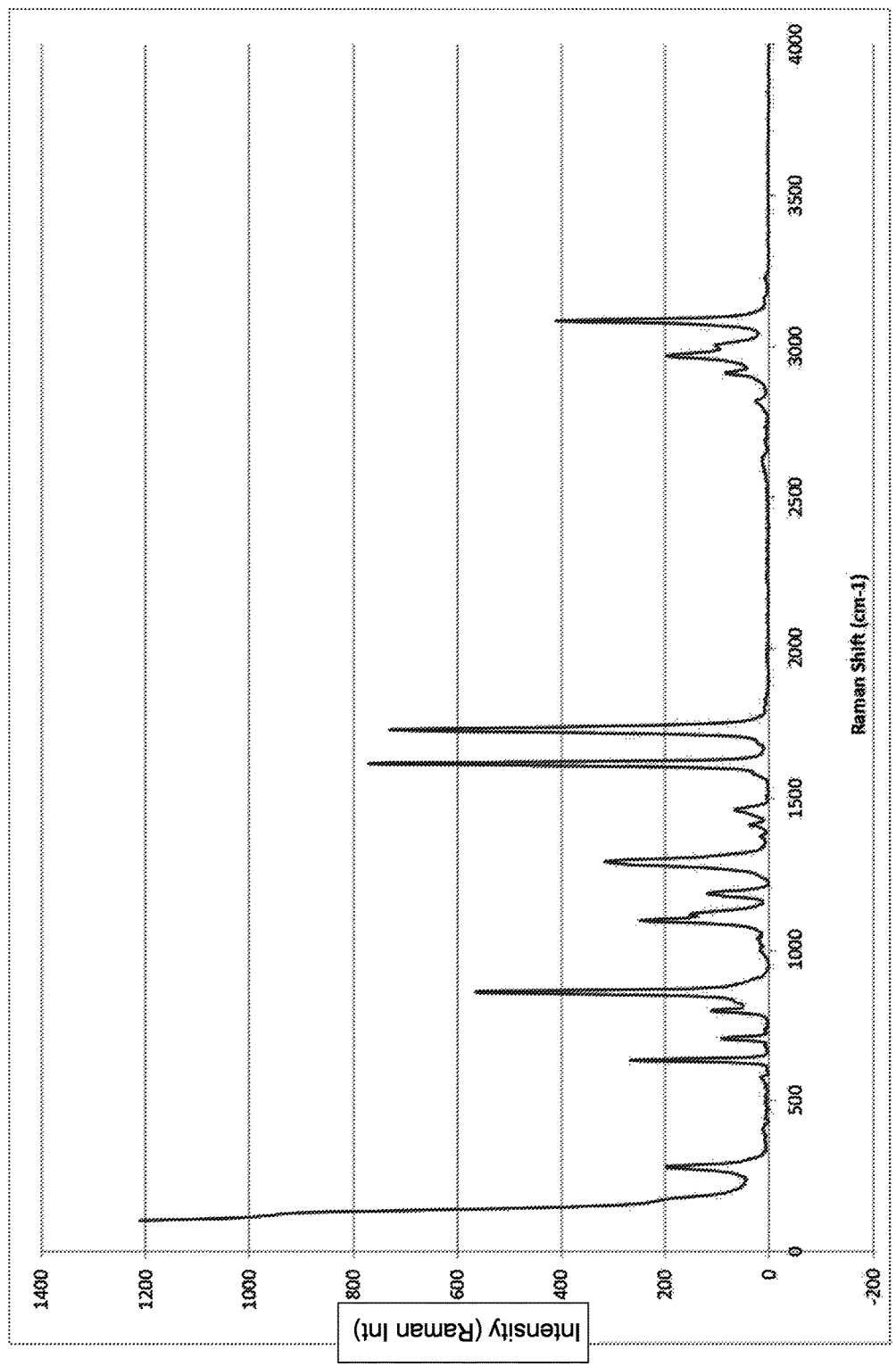
FIG. 10 shows the results of Raman spectrum measurement for Example 1.

A plain woven fabric was produced using a yarn made of polyethylene terephthalate whose raw material polymer had an intrinsic viscosity of 0.90, the yarn having a total fineness of 470 dtex, a filament count of 182 filaments, a single fiber fineness of 2.58 dtex, and a crystal index of 1.47, and scouring and setting were performed to obtain an airbag base fabric in which the weave densities were 57 yarns/2.54 cm in both the warp direction and the weft direction. The durability of this base fabric against ozone was evaluated, and, partly because of the high crystal index, it was found that the strength retention rate was 92% in the warp direction and 94% in the weft direction. Moreover, the result of storability evaluation when this base fabric was used was 42.9 mm, indicating extreme compactness. It was clear from these results that Example 1 was suitable for exterior airbags. FIG. 10 shows the results of Raman spectrum measurement for the yarn used in Example 1.

Example 2

Figure 11:
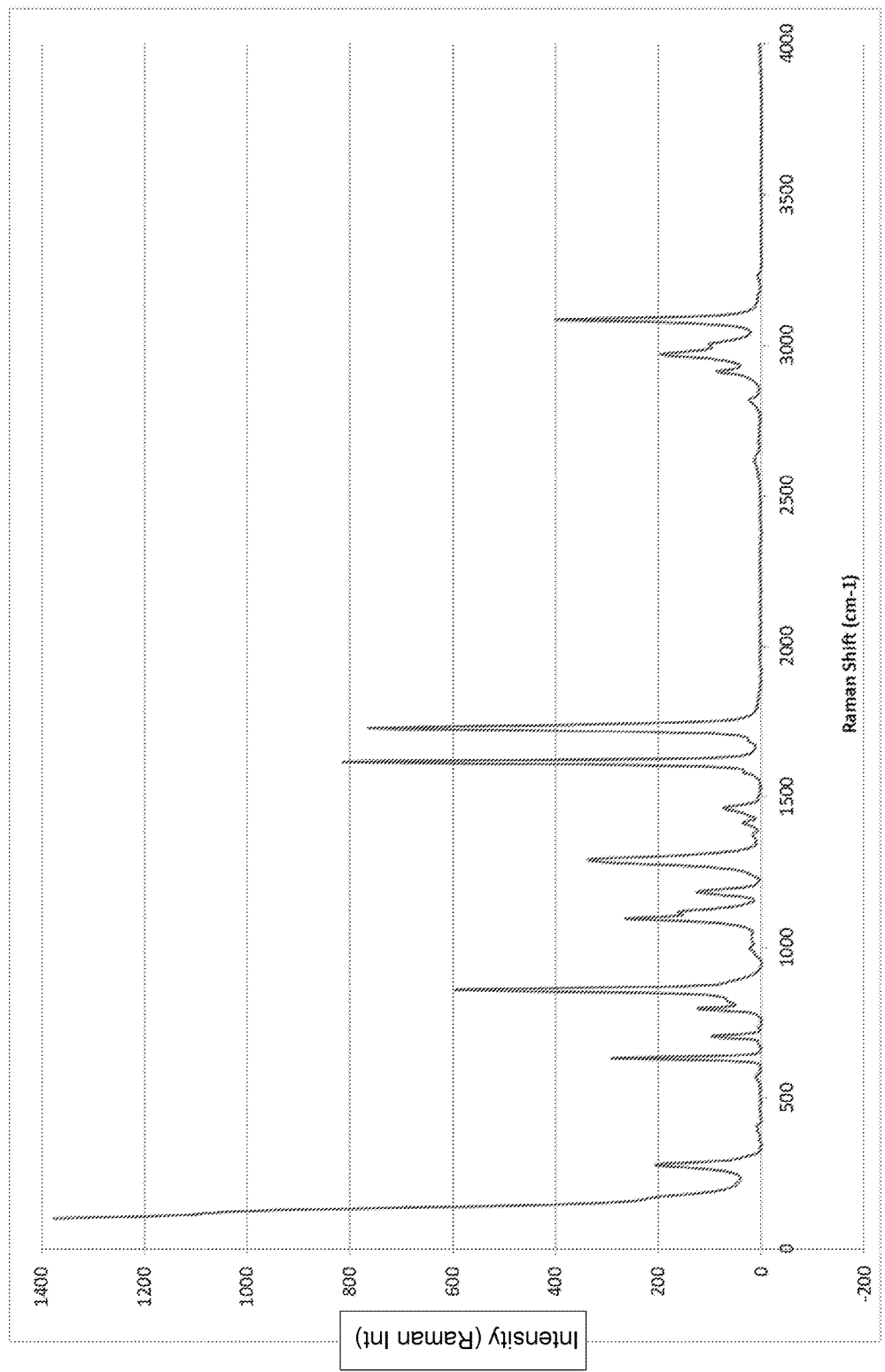
FIG. 11 shows the results of Raman spectrum measurement for Example 2.

A plain woven fabric was produced using a yarn made of polyethylene terephthalate whose raw material polymer had an intrinsic viscosity of 0.90, the yarn having a total fineness of 330 dtex, a filament count of 144 filaments, a single fiber fineness of 2.29 dtex, and a crystal index of 1.44, and scouring and setting were performed to obtain an airbag base fabric in which the weave densities were 71 yarns/2.54 cm in both the warp direction and the weft direction. The durability of this base fabric against ozone was evaluated, and, partly because of the high crystal index, it was found that the strength retention rate was 91% in the warp direction and 85% in the weft direction. Moreover, the result of storability evaluation when this base fabric was used was 40.8 mm, indicating extreme compactness. It was clear from these results that Example 2 was suitable for exterior airbags. FIG. 11 shows the results of Raman spectrum measurement for the yarn used in Example 2.

Example 3

Figure 12:
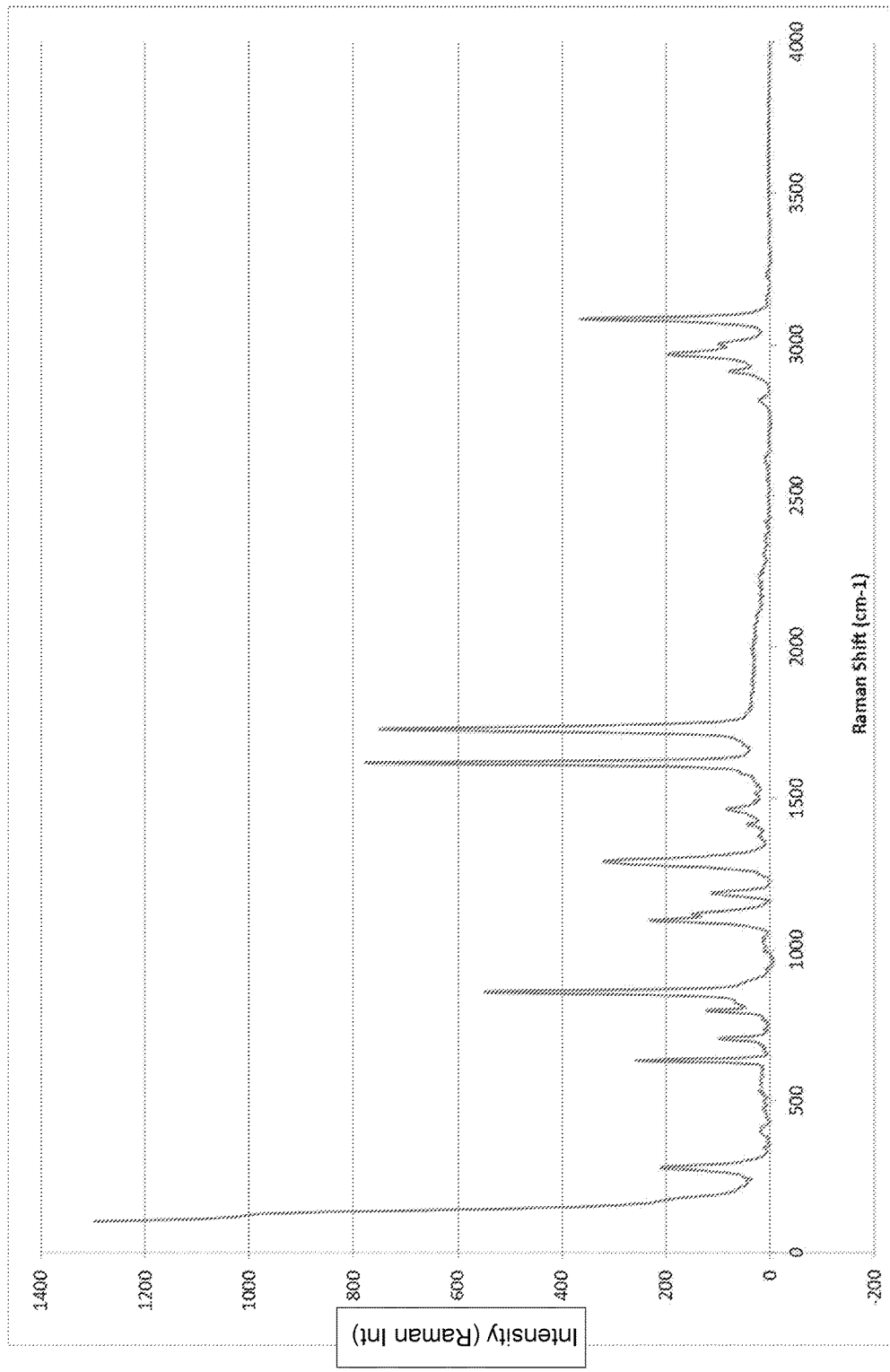
FIG. 12 shows the results of Raman spectrum measurement for Example 3.

A plain woven fabric was produced using a yarn made of polyethylene terephthalate whose raw material polymer had an intrinsic viscosity of 0.90, the yarn having a total fineness of 470 dtex, a filament count of 144 filaments, a single fiber fineness of 3.26 dtex, and a crystal index of 1.31, and scouring and setting were performed to obtain an airbag base fabric in which the weave densities were 57 yarns/2.54 cm in both the warp direction and the weft direction. The durability of this base fabric against ozone was evaluated, and, partly because of the high crystal index, it was found that the strength retention rate was 90% in the warp direction and 81% in the weft direction. Moreover, the result of storability evaluation when this base fabric was used was 43.8 mm, indicating extreme compactness. The base fabric of Example 3 had somewhat low durability, but was still usable for exterior airbags. FIG. 12 shows the results of Raman spectrum measurement for the yarn used in Example 3.

Example 4

A plain woven fabric was produced using a yarn made of polyethylene terephthalate whose raw material polymer had an intrinsic viscosity of 0.87, the yarn having a total fineness of 470 dtex, a filament count of 182 filaments, a single fiber fineness of 2.58 dtex, and a crystal index of 1.47, and scouring and setting were performed to obtain an airbag base fabric in which the weave densities were 53 yarns/2.54 cm in both the warp direction and the weft direction. The durability of this base fabric against ozone was evaluated, and, partly because of the high crystal index, it was found that the strength retention rate was 93% in the warp direction and 91% in the weft direction. Moreover, the result of storability evaluation when this base fabric was used was 41.9 mm, indicating extreme compactness. It was clear from these results that Example 1 was suitable for exterior airbags. Note that, although Example 4 had a somewhat low cover factor, this did not have an influence on deterioration due to ozone and a decrease in storability.

Comparative Example 1

Figure 13:
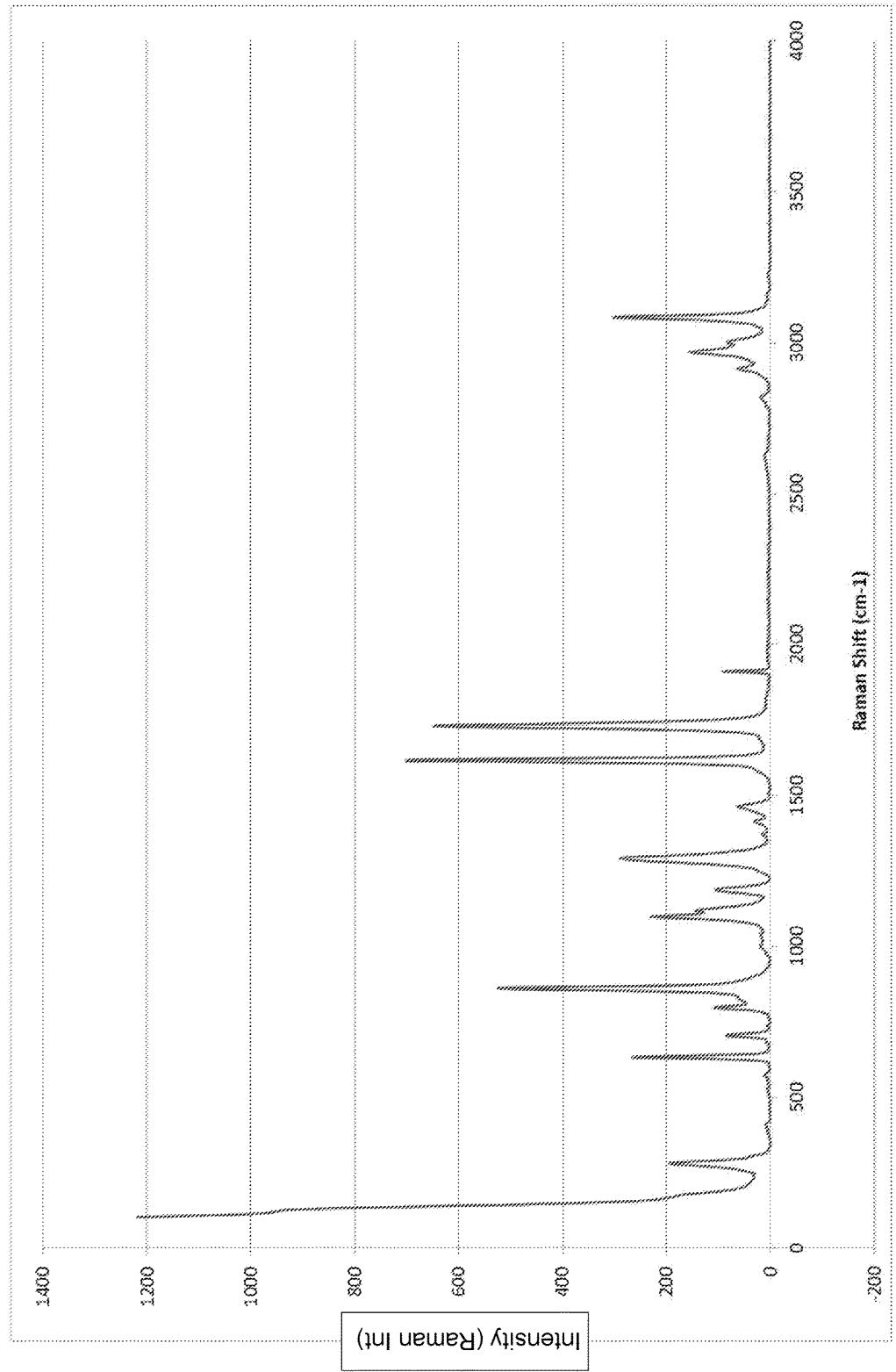
FIG. 13 shows the results of Raman spectrum measurement for Comparative Example 1.

A plain woven fabric was produced using a yarn made of polyethylene terephthalate whose raw material polymer had an intrinsic viscosity of 0.87, the yarn having a total fineness of 560 dtex, a filament count of 182 filaments, a single fiber fineness of 3.08 dtex, and a crystal index of 1.09, and scouring and setting were performed to obtain an airbag base fabric in which the weave densities were 53 yarns/2.54 cm in both the warp direction and the weft direction. The durability of this base fabric against ozone was evaluated, and, partly because of the low crystal index, it was found that the strength retention rate was 88% in the warp direction and 80% in the weft direction, and sufficient performance was not obtained. Furthermore, because of the high total fineness, the result of the storability test in which this base fabric was used was 51.5 mm, indicating that the base fabric did not have enough compactness and was not suitable for exterior airbags. FIG. 13 shows the results of Raman spectrum measurement for the yarn used in Comparative Example 1.

Comparative Example 2

A plain woven fabric was produced using a yarn made of polyethylene terephthalate whose raw material polymer had an intrinsic viscosity of 0.78, the yarn having a total fineness of 470 dtex, a filament count of 144 filaments, a single fiber fineness of 3.26 dtex, and a crystal index of 1.02, and scouring and setting were performed to obtain an airbag base fabric in which the weave densities were 57 yarns/2.54 cm in both the warp direction and the weft direction. The durability of this base fabric against ozone was evaluated, and, partly because of the low crystal index, it was found that the strength retention rate was 82% in the warp direction and 75% in the weft direction, and sufficient performance was not obtained. Moreover, it was considered that the low intrinsic viscosity also had an influence on the strength retention rate. However, because the total fineness was not high, the result of the storability test in which this base fabric was used was 43.5 mm, indicating compactness, but this base fabric was not suitable for exterior airbags because of the low strength retention rate.

Comparative Example 3

A plain woven fabric was produced using a yarn made of polyamide 66, the yarn having a total fineness of 470 dtex, a filament count of 144 filaments, and a single fiber fineness of 3.26 dtex, and scouring and setting were performed to obtain an airbag base fabric in which the weave densities were 53 yarns/2.54 cm in both the warp direction and the weft direction. The durability of this base fabric against ozone was evaluated, and it was found that the strength retention rate was 67% in the warp direction and 64% in the weft direction. This means that the base fabric had poor durability and was not suitable for exterior airbags. It was considered that the reason for this was because polyamide was used. Moreover, with respect to storability, even though the total fineness was not high, the yarn was made of polyamide, which had a different specific gravity than polyethylene terephthalate, and hence the thickness was large, resulting in poor storability.

LIST OF REFERENCE NUMERALS

1 First main body base fabric
2 Second main body base fabric
3 Inflator attachment opening
4 Vent
5 Bolt fixing hole
6a, 6b Annular fabric
7a, 7b, 7c, 7d Sewing portion
8 Form prior to folding
9 Form in a mid-folding state
10 Form after completion of folding
11 Cross-sectional view of form 8 taken along line D-D
12 Cross-sectional view of form 9 taken along line E-E
13 Cross-sectional view of form 9 taken along line F-F
14 Cross-sectional view of form 10 taken along line G-G
15 Airbag
16 Aluminum plate
17 Weight
A Weaving yarn directions of first main body base fabric
B Weaving yarn directions of annular fabric 6
C Weaving yarn directions of second main body base fabric

The invention claimed is:

1. An airbag base fabric comprising: a woven fabric made from a yarn containing polyethylene terephthalate as a main raw material, the yarn having: a single fiber fineness of 1.0 to 3.9 dtex, a total fineness of 280 to 470 dtex, and the polyethylene terephthalate has an intrinsic viscosity of 0.80 to 1.20, and a spectral intensity Ix at 3083 $cm^{-1}$ in a Raman spectrum obtained by irradiating the yarn with a He—Ne laser with a wavelength of 630 nm, wherein a cover factor of the airbag base fabric is 2298 to 2800, where the cover factor=warp density of the woven fabric x (total fineness of the warp)+weft density of the woven fabric x \(Total fineness of the weft), wherein Ix/Io is 1.20 or more, where Ix is a spectral intensity at 3083 cm, and Io=277.4, and wherein said $I_o$ is the spectral intensity at 3083 $cm^{-1}$ which is read from the Raman spectrum obtained by irradiating a polyethylene terephthalate yarn having a fixed viscosity=0.64, a He—Ne laser with a wavelength of 630 nm, and wherein a viscosity value of the solution of the raw material polymer chip of the yarn adjusted to a concentration of 10 g/L is measured as the intrinsic viscosity, where a mixed solution of phenol and tetrachloroethane (mixing ratio=6:4) is used as the solvent for the solution, the raw material polymer chip is dissolved for 1 hour at 80° C., and the measurements of the viscosity value is performed under the conditions of 20° C.

2. The airbag base fabric according to claim 1, which has the cover factor of 2400 to 2800.

3. An airbag formed of at least the airbag base fabric according to claim 1.

* * * * *